(12) United States Patent
Robert et al.

(10) Patent No.: US 9,473,501 B2
(45) Date of Patent: *Oct. 18, 2016

(54) SYSTEM AND METHOD FOR ASSOCIATING A UNIVERSAL USER IDENTIFICATION AND A DOMAIN SPECIFIC USER IDENTIFICATION

(71) Applicant: Disney Enterprises, Inc., Burbank, CA (US)

(72) Inventors: Arnaud Robert, Simi Valley, CA (US); Edward C. Drake, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,091

(22) Filed: Feb. 26, 2016

(65) Prior Publication Data

US 2016/0182521 A1 Jun. 23, 2016

Related U.S. Application Data

(63) Continuation of application No. 14/271,299, filed on May 6, 2014, now Pat. No. 9,306,928, which is a continuation of application No. 12/928,350, filed on Dec. 8, 2010, now Pat. No. 8,769,646.

(51) Int. Cl.
*H04L 29/06* (2006.01)

(52) U.S. Cl.
CPC .......... *H04L 63/10* (2013.01); *H04L 63/0236* (2013.01); *H04L 63/08* (2013.01)

(58) Field of Classification Search
CPC ...... H04L 63/08; H04L 63/107; G06F 21/41
See application file for complete search history.

(56) References Cited

U.S. PATENT DOCUMENTS

| | | | |
|---|---|---|---|
| 7,152,108 B1* | 12/2006 | Khan | G06F 21/62 709/225 |
| 2008/0086770 A1* | 4/2008 | Kulkarni | H04L 63/0876 726/20 |
| 2009/0012934 A1* | 1/2009 | Yerigan | G06F 21/105 |
| 2011/0088087 A1* | 4/2011 | Kalbratt | G06Q 20/02 726/7 |
| 2011/0321127 A1* | 12/2011 | Pitroda | G06Q 20/02 726/3 |

* cited by examiner

*Primary Examiner* — Amir Mehrmanesh
(74) *Attorney, Agent, or Firm* — Farjami & Farjami LLP

(57) ABSTRACT

There is presented a system and method for associating a domain transcendent identification (ID) of a user and a domain specific ID of the user, the system comprising an ID association server accessible by a plurality of secure domains over a network. The system also includes an ID associator application that when executed by ID association server is configured to receive a domain specific ID that associates the user to the secure domain, enter the domain specific ID in a domain transcendent ID record created for the user, generate a unique data associated with the domain transcendent ID record and identify a network location for submission of the unique data, send the unique data and the network location to the user, and associate the domain transcendent ID and the domain specific ID.

18 Claims, 3 Drawing Sheets

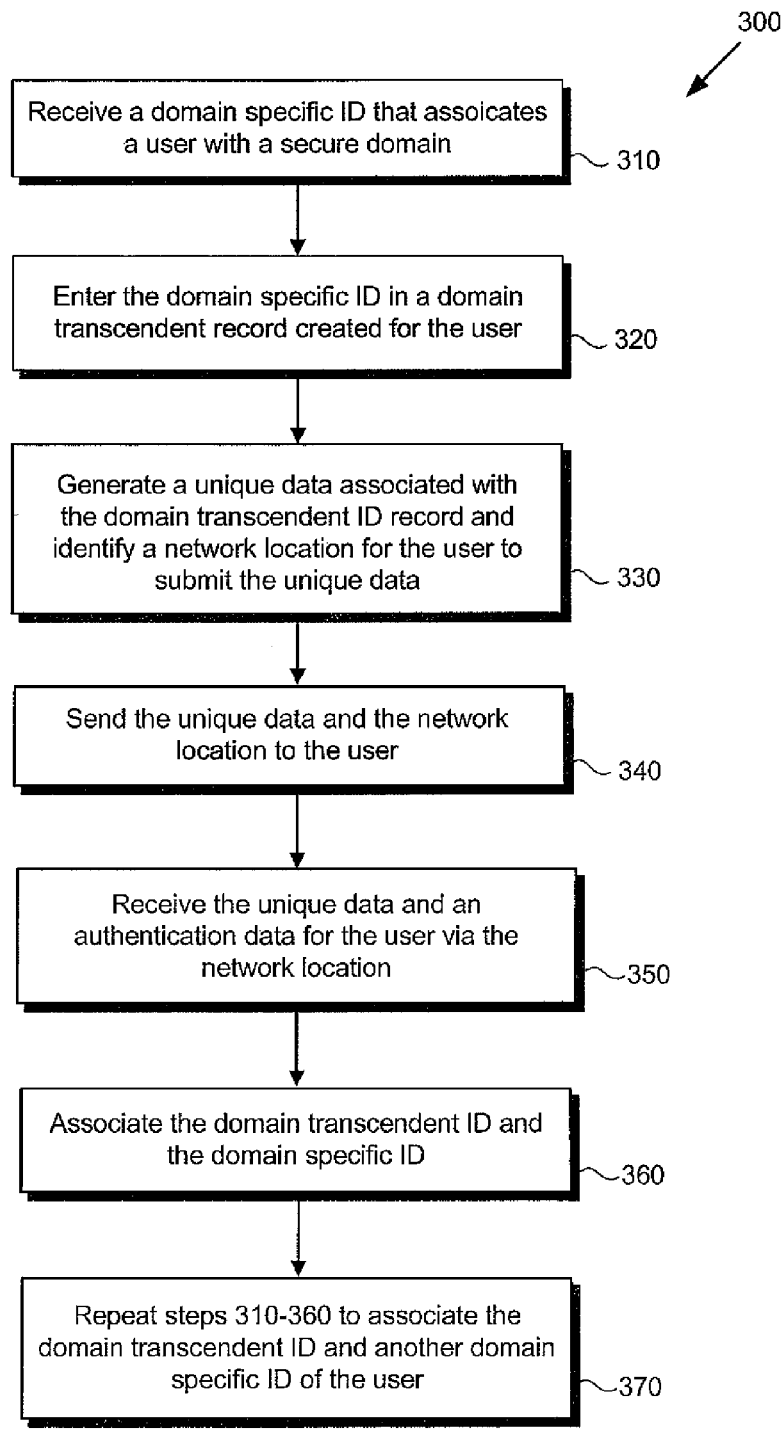

SYSTEM AND METHOD FOR ASSOCIATING A UNIVERSAL USER IDENTIFICATION AND A DOMAIN SPECIFIC USER IDENTIFICATION

This application is a Continuation of U.S. application Ser. No. 14/271,299, filed May 6, 2014, which is a Continuation of U.S. application Ser. No. 12/928,350, filed Dec. 8, 2010, which is hereby incorporated by reference in its entirety.

BACKGROUND OF THE INVENTION

1. Field of the Invention

The present invention relates generally to user authentication. More particularly, the present invention relates to systems and methods for associating a universal user identification with one or more domain specific identifications of the user.

2. Background Art

Consumers are increasingly turning to online providers when shopping for goods and services. In an effort to protect the personal and financial information required to complete an online transaction, providers of goods and services typically provide a secure network domain and require that the consumer participate in creating a user identity specific to the provider and their secure network domain. This user identity may consist of potentially sensitive personally identifiable information such as an address, telephone number, credit card information, email address, and the like. In addition, the consumer may be required to create log-in credentials such as a username and password to authenticate their identity to the provider when engaging in a transaction using the secure domain.

In a conventional approach to managing a user identity within a secure provider domain, the potentially sensitive consumer information and consumer credentials are relationally linked together by the provider in the form of a unique provider defined consumer identification (consumer ID). Across a network, such as the Internet, for example, a consumer may have a unique user identity and related unique provider generated consumer ID that is domain specific and associates them only to the secure domain of the respective provider, for each provider with which the consumer interacts. As a result, in such a conventional regime, should a provider wish to share transaction information for a given consumer with one or more other providers, they are unable to not do so without sharing consumer credentials or other potentially sensitive information to identify and link them.

Although there have been efforts in the conventional art to implement a universal network ID, such as through use of the OpenID format, for example, those endeavors have generally been limited in their effectiveness. For instance, several trusted third-party identity providers presently exist and are capable of providing an authentication interface and a service verifying a recognized user's identity for more than one secure provider domain. However, because of the number trusted third-party identity providers in existence and the absence of coordination among them, most users derive little more than single sign-on functionality from existing approaches to providing universal identification. In addition, because user's typically acquire more than one universal ID from more than one existing trusted third-party identity provider, the user's profile is likely to be fragmented and distributed among his/her several so called universal IDs. Moreover, because there is no coherent approach for associating the multiple universal IDs acquired by the user from different trusted third party identity providers, there is no mechanism for collecting that fragmentary information and associating it with a single user.

Accordingly, there is a need to overcome the drawbacks and deficiencies in the art by providing a solution for associating a universal network ID of a consumer with one or more domain specific IDs that associate the consumer with the respective secure domains established by individual network based providers of goods and/or services.

SUMMARY OF THE INVENTION

There are provided systems and methods for associating a universal network identification of a user with one or more domain specific identifications of the user, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 is a flowchart presenting a method for associating a domain transcendent ID of a user and at least one domain specific ID of the user, according to one embodiment of the present invention.

DETAILED DESCRIPTION OF THE INVENTION

Figure 1:
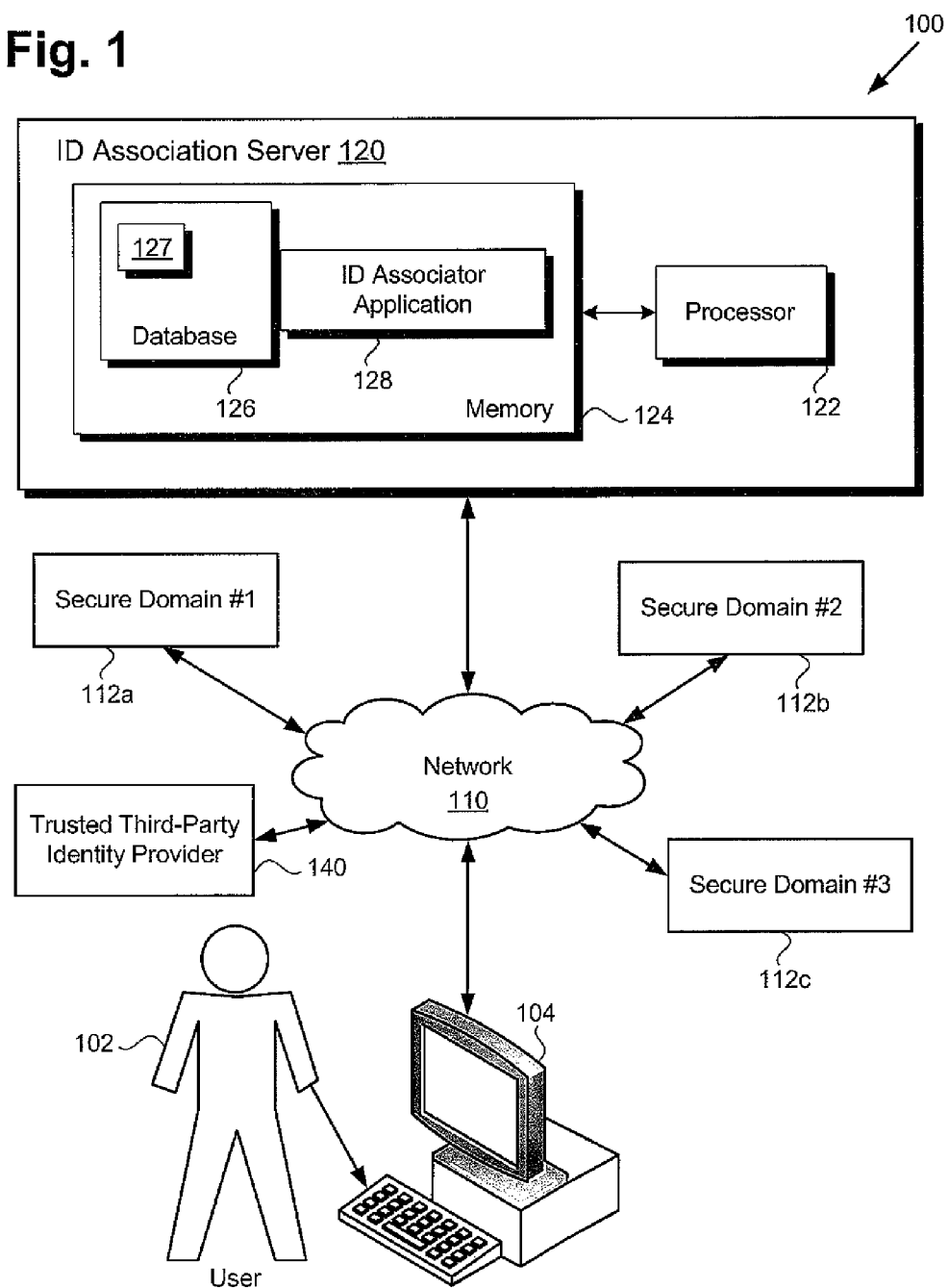
FIG. 1 shows a block diagram of a system for associating a domain transcendent, e.g., "universal," identification (ID) of a user and at least one domain specific ID of the user, according to one embodiment of the present invention.

The present application is directed to a system and method for associating a domain transcendent, e.g., "universal," identification (ID) of a user and one or more domain specific IDs of the user. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a block diagram of a system for associating a domain transcendent ID of a user and one or more domain specific IDs of the user, according to one embodiment of the present invention. System 100 comprises ID association server 120 including processor 122 and memory 124. As shown in FIG. 1, memory 124 stores database 126 containing domain transcendent ID record 127 and ID associator application 128. As further shown in FIG. 1, ID association server 120 is accessible by a plurality of secure domains, e.g., secure domains 112*a*, 112*b*, and 112*c*, over network 110, which may be any suitable communications network. For example, in one embodiment, network 110 may comprise a packet network, such as the Internet. Also shown in FIG. 1 are trusted third-party identity provider 140, user 102, and client-side computer 104 utilized by user 102 to interact with one or more of trusted third-party identity provider 140 and secure domains 112*a*, 112*b*, and 112*c* over network 110.

It is noted that, for the purposes of the present invention, the expressions "universal ID" and "domain transcendent ID" may be used interchangeably to signify an ID of user 102 that uniquely identifies user 102 across a plurality of secure domains. In one embodiment, a domain transcendent ID of user 102, while uniquely identifying user 102 across secure domains 112*a*, 112*b*, and 112*c*, for example, does not include personally identifiable information linked to user 102. It is further noted that, as used herein, the expression "domain specific ID" refers to an ID generated by any of secure domains 112*a*, 112*b*, and 112*c* to identify and authenticate user 102 within that respective secure domain. As such, a domain specific ID of user 102 may include personally identifiable information linked to user 102, and is typically not used or recognized outside of the secure domain in which it is generated.

According to the embodiment of FIG. 1, however, ID associator application 128 can be executed by processor 122 of ID association server 120 so as to perform a method for associating a domain transcendent ID of user 102, provided by trusted third-party identity provider 140, with one or more domain specific IDs that associate user 102 with any of respective secure domains 112*a*, 112*b*, and 112*c*. As a result, user 102 may enjoy a more seamless network experience by being relieved of the necessity of interacting with multiple log-in protocols and of entering multiple username and password combinations. For example, where user 102 has opted in to association of his or her domain specific IDs on each of secure domains 112*a*, 112*b*, and 112*c* with a domain transcendent ID of the user provided by trusted third-party identity provider 140 and stored on ID association server 120, ID associator application 128 can be configured to facilitate network interactions of user 102 among secure domains 112*a*, 112*b*, and 112*c*, while assuring that the personally identifiable information associated with the domain specific IDs is not shared among the secure domains.

In addition, in one embodiment, information related to transactions between user 102 and any one of secure domains 112*a*, 112*b*, and 112*c*, and not including personally identifiable information, can be shared among secure domains 112*a*, 112*b*, and 112*c*. For example, where secure domains 112*a*, 112*b*, and 112*c* correspond to mutually autonomous providers of related goods and/or services, e-commerce transaction information, such as a history of product purchases, can be shared among the respective providers, thereby enabling them to be responsive to the preferences and known product acquisitions by user 102.

Although the present discussion has thus far described ID associator application 128 and database 126 including domain transcendent ID record 127 as residing in memory 124 of ID association server 120, more generally, either or both of ID associator application 128 and database 126 may be stored, either together or separately, on any suitable computer-readable medium accessible by ID association server 120. The expression "computer-readable medium," as used in the present application, refers to any medium that provides instructions to a processor, such as processor 122 of ID association server 120. Thus, a suitable computer-readable medium may correspond to various types of media, such as volatile media or non-volatile media, for example. Volatile media may include dynamic memory, such as dynamic random access memory (dynamic RAM), while non-volatile memory may include optical, magnetic, or electrostatic storage devices. Common forms of computer-readable media include, for example, a compact disc read-only memory (CD-ROM), DVD, or other optical disc; a RAM, programmable read-only memory (PROM), erasable PROM (EPROM), and FLASH memory.

It is further noted that in other embodiments, the functionality represented in FIG. 1 as being provided by single ID Association Server 120, may in fact be provided by one or more additional servers. Thus, more generally, ID Association Server 120 may be seen to correspond to a server network for implementing the present inventive concepts. Moreover, although much of the present discussion characterizes third-party identity provider 140 as providing the domain transcendent ID for user 102, as well as providing other authentication data, in some embodiments those functions may be performed by other assets of system 100. Thus, in some embodiments, the services characterized as being provided by trusted third-party identify provider 140 may be provided as first-party operations by system 100 itself.

Figure 2:
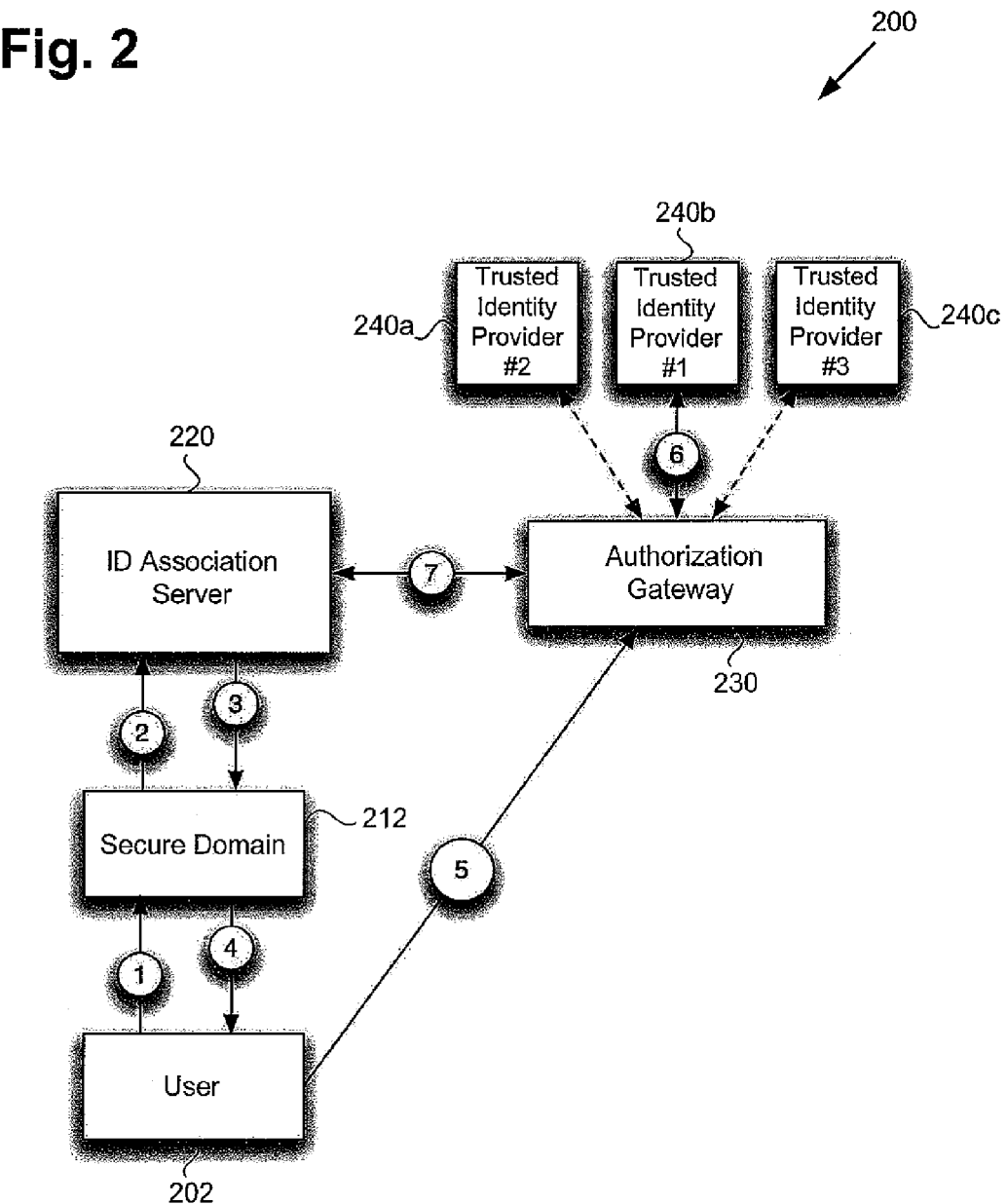
FIG. 2 shows a block diagram depicting a series of network interactions including participation by a system for associating a domain transcendent ID of a user and at least one domain specific ID of the user, according to one embodiment of the present invention.

The operation of system 100, in FIG. 1, will now be further described by reference to FIGS. 2 and 3. FIG. 2 shows a block diagram depicting a series of network interactions including participation by a system for associating a domain transcendent ID of a user and at least one domain specific ID of the user, according to one embodiment of the present invention, while FIG. 3 presents a flowchart of an exemplary method for performance by such a system.

FIG. 2 shows network interaction 200 in which user 202, secure domain 212, ID association server 220, authorization gateway 230 and at least one of trusted third-party identity providers 240*a*, 240*b*, and 240*c* participate. User 202 and ID association server 220 correspond respectively to user 102 and ID association server 120, in FIG. 1, and secure domain 212, in FIG. 2, corresponds to any one of secure domains 112*a*, 112*b*, or 112*c*, in FIG. 1, while trusted third-party identity provider 140 in that previous figure corresponds, in FIG. 2, to any of trusted third-party identity providers 240*a*, 240*b*, and 240*c*. Moreover network interaction 200, in FIG. 2, may be seen to correspond to a series of network communications, represented by communication arrows 1, 2, 3, 4, 5, 6, and 7 in the present embodiment, in which ID association server 220 associates a domain transcendent ID of user 202 with a domain specific ID of user 202 that associates user 202 to secure domain 212. That association, performed using ID association server 220, may occur at the behest and on behalf of user 202, and corresponds, in FIG. 1, to user 102 utilizing client-side computer 104 to interact with one of secure domains 112*a*, 112*b*, or 112*c*, and ID association server 120, over network 110. Consequently, it may be understood that network interaction 200, represented in FIG. 2, may be repeated more than once so as to associate the domain transcendent ID of user 202 with additional domain specific IDs that associate user 202 to respective additional secure domains, such as others of the secure domains 112*a*, 112*b*, or 112*c*, in FIG. 1.

Referring now to FIG. 3, FIG. 3 is a flowchart presenting a method for associating a domain transcendent ID of a user and at least one domain specific ID of the user, according to one embodiment of the present invention. The steps shown in flowchart 300 are provided merely as examples, however, so that a step may consist of one or more substeps or may involve specialized equipment or materials, as known in the art. While steps 310 through 370 indicated in flowchart 300 are sufficient to describe one embodiment of the present invention, other embodiments may utilize steps different from those shown in flowchart 300, or may include more, or fewer steps.

Starting with step 310 in FIG. 3, step 310 of flowchart 300 comprises receiving a first domain specific ID that associates a user to one of any number of secure domains accessible over a network. Referring to FIG. 1, step 310 may be performed by ID association server 120 under the control of processor 122 executing ID associator application 128, for example. Referring to network interaction 200, in FIG. 2, step 310 of flowchart 300 may be seen to correspond to communication arrow 2 received by ID association server 220 from secure domain 212.

To provide an example context for the interaction represented in FIGS. 1 and 2, user 102/202 may be seen to be a consumer seeking a commercial good or service, for example, an item of media content such as an e-book or digital movie content, from a media content provider over the Internet. The media content provider or providers, for example, Amazon, Barnes & Noble, or Blockbuster online, establish respective secure domains, such as secure domains 112a, 112b, and 112c, to authenticate recognized users of the secure domain, as well as to protect sensitive and/or personally identifiable information entered into the secure domain by the user during a registration process or in conjunction with a commercial, e.g., "e-commerce" transaction.

According to the present e-commerce example, user 102, acting as a potential consumer, accesses one of secure domains 112a, 112b, or 112c, which are all secure domains configured to utilize the domain transcendent ID association provided by system 100, for example, by performing a log-in operation over network 110, using client-side computer 104. Once logged-in to one of secure domains 112a, 112b, or 112c, user 102 may be invited to link their domain specific ID associating them to the respective secure domain with a domain transcendent ID, such as an ID of user 102 recognized by a trusted third-party identity provider, which may be an OpenID provider such as Google, Facebook, or VeriSign, for example. Referring again to FIG. 2, the decision to opt in to such an invitation by user 202 can be seen to correspond to communication arrow 1 linking user 202 and secure domain 212.

Having obtained the consent of user 202 to share domain specific ID information with ID association server 220, secure domain 212 then sends the domain specific ID that associates user 202 to secure domain 212, such as a consumer ID of user 202 on secure domain 212, to ID association server 220. In addition, secure domain 212 may also be expected to send provider information identifying the commercial entity corresponding to secure domain 212. That communication of provider information and/or the domain specific ID of user 202 by secure domain 212 corresponds to communication arrow 2, and receipt of that communication by ID association server 220 may be seen to correspond to step 310, in FIG. 3.

It is noted that the e-commerce example discussed above, and also further discussed below in conjunction with other method steps, has been introduced for the purposes of conceptual clarity, and is not intended to define the invention. For example, in other embodiments, a user may be invited to link their domain specific ID associating them to the respective secure domain with a domain transcendent ID as part of a login process of the secure domain, and that invitation may be independent of any commercial transaction. In yet other embodiments, such an invitation may take the form of a provider initiated communication sent by the secure domain to the user, either within a user session or outside the user session. For example, in one embodiment, the user may be invited to link their domain specific ID associating them to the respective secure domain with a domain transcendent ID, and that invitation may be sent to the user as an email communication to the user's personal email account. That communication may be solicited or unsolicited by the user, and the user's affirmative response to the invitation can result in occurrence of step 310.

Continuing with step 320 in FIG. 3, and referring to FIG. 1, step 320 of flowchart 300 comprises entering the domain specific ID received from the secure domain in domain transcendent ID record 127 created for user 102 and stored in memory 124 of system 100. Step 320 may be performed by ID association server 120 under the control of processor 122 and ID associator application 128, for example, and may include either creation of domain transcendent ID record 127, or simply entry of the domain specific ID as an update to existing domain transcendent ID record 127 where such a record was created during a previous transaction between user 102 and one of secure domains 112a, 112b, or 112c.

Moving on to step 330 in FIG. 3 and continuing to refer to FIG. 1, step 330 of flowchart 300 comprises generating a unique data associated with domain transcendent ID record 127 and identifying a location of network 110 for user 102 to submit the unique data. Once again, step 330 may be performed by ID association server 120 under the control of processor 122 and ID associator application 128. In one embodiment, the unique data may comprise a token capable of being interpreted so as to identify domain transcendent ID record 127 and/or ID association server 220.

By way of example, a token can be created using a cryptographic hash function, such as Message-Digest algorithm 5 (MD5) or Secure Hash Algorithm 1 (SHA-1), for example, and applying the hash function to a unique data set. The unique data set may include the identity of the secure domain from which the domain specific ID was received in step 310, as well as data associated with the user, and other data, such as a time or date stamp, for example. The unique data set may then be hashed to generate the token. Referring again to FIG. 2, a network location for submission of the unique data, e.g., token, by user 202 may comprise authorization gateway 230, and identifying the location of authorization gateway 230 may comprise identifying the Uniform Resource Locator (URL) at which authorization gateway 230 can be accessed on the network.

In one embodiment, authorization gateway 230 may be an asset of a system for associating a domain transcendent ID of a user and at least one domain specific ID of the user, such as system 100, in FIG. 1. For example, authorization gateway may comprise an application programming interface (API) of system 100 configured for use with Id associator application 128. In another embodiment, however, authorization gateway 230 may not be included as part of system 100, and may be provided instead as a third-party asset configured to work cooperatively with ID associator application 128 and ID association server 120, for example.

Proceeding to step 340 of FIG. 3 and continuing to refer to FIGS. 1 and 2, step 340 of flowchart 300 comprises sending the unique data, e.g., token, and the network location, e.g., URL of authorization gateway 230, to user 202 via secure domain 212. Step 340 may be performed by ID association server 120 under the control of processor 122 and ID associator application 128. As may be apparent from FIG. 2, step 340 can correspond to communication arrows 3 and 4, respectively linking ID association server 220 with secure domain 212 and secure domain 212 with user 202. In one embodiment, the unique data and/or the network location sent by ID association server 220 may be time sensitive, such as by being associated with a usable time window after which the unique data and/or network location are expired. For example, in one embodiment, the network location, e.g., URL, sent in step 340 may be accessible by user 202 for a limited time period after the unique data is sent to user 202 via secure domain 212, after which time period the network location, e.g., authorization gateway 230, can no longer be accessed by user 202 at that URL.

Continuing with step 350 of flowchart 300, step 350 comprises receiving the unique data, e.g., token, and an authentication data for user 202 via the network location, e.g., authorization gateway 230. As further shown in FIG. 2, authorization gateway 230 may be configured to mediate authentication of user 202 by any one of multiples trusted third-party identity providers 240a, 240b, and 240c. The authentication data provided by the relevant one of trusted third-party identity providers 240a, 240b, and 240c includes the domain transcendent ID of user 202, such as the OpenID for that respective trusted third-party identity provider, for example.

Once again, step 350 may be performed by ID association server 120 under the control of processor 122 and ID associator application 128, in FIG. 1. Referring again to FIG. 2, in response to step 340, user 202 is provided with a network location, e.g., authorization gateway 230, to which to navigate in order to continue with the domain transcendent ID association process. Communication arrow 5 may be seen to correspond to that navigation to authorization gateway 230 undertaken by user 202, for example by means of client-side computer 104 and network 110, in FIG. 1.

Authorization gateway 230 may be configured to invite user 202 to select a trusted third-party identity provider from one or more eligible trusted third-party providers, such as trusted third-party identify providers 240a, 240b, and 240c, for example. According to the embodiment shown in FIG. 2, user 202 selects trusted third-party identity provider 240b, and authorization gateway 230 mediates authentication of user 202 by trusted third-party identity provider 240b in a communication corresponding to communication arrow 6. In addition, authorization gateway 230 may be configured to query additional information from trusted third-party identity provider 240b as authorized by user 202, such as a verified email address and the username of user 202 associated with trusted third-party identity provider 240b, for example. The authentication data, including the additional information queried from trusted third-party identity provider 240b is received by ID association server 220 in step 350 of FIG. 3, corresponding to communication arrow 7, in FIG. 2.

Referring now to step 360 in FIG. 3, step 360 of flowchart 300 comprises associating the domain transcendent ID and the domain specific ID. Step 360 may be performed by ID association server 120 under the control of processor 122 and ID associator application 128, in FIG. 1, and may include writing an entry into domain transcendent ID record 127 of database 126. Referring to FIG. 2, such an entry may record the association of the domain transcendent ID of user 202 received from trusted third-party identity provider 240b via authorization gateway 230, in step 350 of flowchart 300, and the domain specific ID, e.g., consumer ID, received from secure domain 212 in step 310.

In one embodiment, the method of flowchart 300 may be performed as part of an e-commerce transaction between user 202 and secure domain 212. Moreover, in one embodiment, receipt of the unique data, e.g., token, and the authentication data in step 350 of flowchart 300 may occur after delivery of a good procured by user 202 in such an e-commerce transaction with secure domain 212. For example, association of a domain transcendent "universal" ID of user 202 with a consumer ID specific to secure domain 212 may be performed as part of a transaction in which user 202 purchases digital movie content from secure domain 212 over the network, and step 350 of flowchart 300 may occur after consumer 202 receives the digital media content from secure domain 212.

As indicated by step 370 of flowchart 300, steps 310 through 360 may be repeated for additional domain specific IDs that associate the user with respective additional secure domains. Referring to FIG. 1, for example, where a first iteration of steps 310 through 360 associated a domain transcendent ID of user 102 with a user ID specific to secure domain 112a, a second iteration of steps 310 through 360 may be performed to associate the domain transcendent ID with another user ID specific to secure domain 112b, and so forth. In addition, association of multiple domain specific IDs of user 102 with a single domain transcendent ID of user 102 also associates those domain specific IDs with one another in domain transcendent ID record 127, thereby streamlining the network experience of user 102 by enabling use of a single domain transcendent ID for authentication across a plurality of secure domains.

Although it is contemplated that user 102 may choose to consistently utilize the same trusted third-party identity provider when participating in the association process represented by flowchart 300, in one embodiment, system 100 is further configured to enable user 102 to change the trusted third-party identity provider after the domain transcendent ID and the first domain specific ID are initially associated, thereby providing user 102 with additional choice and flexibility in managing his or her domain transcendent network identity.

In addition, it may be the case that a user will, purposefully or otherwise, utilize more than one domain transcendent ID provided by corresponding multiple respective trusted third-party identity providers in the course of his/her network interactions. Consequently, in some embodiments, the system of FIG. 1 and the method of flowchart 300, in FIG. 3, may be adapted to link more than one domain transcendent ID together to create an integrated logical domain transcendent user ID. For example, in addition to associating a particular domain transcendent ID with one or more domain specific IDs, as exemplified by FIG. 3, the present inventive concepts can be extended to enable the user to link that domain transcendent ID with another domain transcendent ID, thereby providing a mechanism for collecting and harmonizing user specific information across the network by further associating some or all of the domain specific IDs associated with each domain transcendent ID of the user together.

Thus, a system and method for associating a domain transcendent, e.g., universal, ID of a user and one or more domain specific IDs of the user has been described. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method comprising:
   sending a request, by a client computer to a secure domain, for associating a domain specific ID of a user with a domain transcendent ID of the user; and
   receiving, by the client computer from the secure domain and in response to the sending of the request, a network location and a unique data generated by an ID association server and associated with the domain transcendent ID, the network location identifying an authorization gateway for authenticating the unique data by a trusted third-party identity provider, and the unique data being for use by the authorization gateway to identify the domain transcendent ID of the user for associating the domain transcendent ID of the user with the domain specific ID of the user, wherein the domain transcendent ID of the user is associated with at least one or more other domain specific IDs of the user;
   wherein the sending and the receiving are part of a user login process onto the secure domain.

2. The method of claim 1, wherein the domain transcendent ID is associated with other domain transcendent IDs of the user provided by other trusted third-party identify providers.

3. The method of claim 1, wherein the domain transcendent ID of the user is used for authentication across one or more other secure domains.

4. The method of claim 1, wherein the network location is accessible by the user for a limited time period after the unique data is sent to the user via the secure domain.

5. The method of claim 1, wherein the domain transcendent ID and the domain specific ID are associated as part of an e-commerce transaction between the user and the secure domain.

6. The method of claim 1, wherein the domain transcendent ID and the domain specific ID are associated as a result of a response by the user to a communication initiated by the secure domain to the user.

7. The method of claim 1, wherein the domain transcendent ID and the domain specific ID are associated as a result of a response by the user to a communication provided by the secure domain to the user outside a user session of the secure domain.

8. The method of claim 1, wherein the network location comprises a Uniform Resource Locator (URL).

9. The method of claim 1, wherein the unique data is received after delivery of a good procured by the user in an e-commerce transaction with the secure domain.

10. A client computer comprising:
    a hardware processor configured to:
       send a request to a secure domain for associating a domain specific ID of a user with a domain transcendent ID of the user; and
       receive from the secure domain, in response to the sending of the request, a network location and a unique data generated by an ID association server and associated with the domain transcendent ID, the network location identifying an authorization gateway for authenticating the unique data by a trusted third-party identity provider, and the unique data being for use by the authorization gateway to identify the domain transcendent ID of the user for associating the domain transcendent ID of the user with the domain specific ID of the user, wherein the domain transcendent ID of the user is associated with at least one or more other domain specific IDs of the user;
    wherein the sending and the receiving are part of a user login process onto the secure domain.

11. The client computer of claim 10, wherein the domain transcendent ID is associated with other domain transcendent IDs of the user provided by other trusted third-party identify providers.

12. The client computer of claim 10, wherein the domain transcendent ID of the user is used for authentication across one or more other secure domains.

13. The client computer of claim 10 wherein the network location is accessible by the user for a limited time period after the unique data is sent to the user via the secure domain.

14. The client computer of claim 10, wherein the domain transcendent ID and the domain specific ID are associated as part of an e-commerce transaction between the user and the secure domain.

15. The client computer of claim 10, wherein the domain transcendent ID and the domain specific ID are associated as a result of a response by the user to a communication initiated by the secure domain to the user.

16. The client computer of claim 10, wherein the domain transcendent ID and the domain specific ID are associated as a result of a response by the user to a communication provided by the secure domain to the user outside a user session of the secure domain.

17. The client computer of claim 10, wherein the network location comprises a Uniform Resource Locator (URL).

18. The client computer of claim 10, wherein the unique data is received after delivery of a good procured by the user in an e-commerce transaction with the secure domain.

* * * * *